United States Patent
Estruth et al.

(10) Patent No.: US 7,374,083 B2
(45) Date of Patent: May 20, 2008

(54) METHOD OF SELLING AND ACTIVATING CONSUMER PRODUCTS AND SERVICES

(75) Inventors: Nathan Daniel Estruth, Cincinnati, OH (US); Christopher Steven Miller, Cincinnati, OH (US); Jared Bernard Kline, Cincinnati, OH (US); Michael Nyle Hershberger, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 11/085,386

(22) Filed: Mar. 21, 2005

(65) Prior Publication Data
US 2005/0246233 A1   Nov. 3, 2005

Related U.S. Application Data

(60) Provisional application No. 60/557,523, filed on Mar. 30, 2004.

(51) Int. Cl.
*G06F 7/08* (2006.01)
(52) U.S. Cl. ..................... 235/381; 235/383
(58) Field of Classification Search ............... 235/381, 235/375, 383; 705/2, 4
See application file for complete search history.

(56) References Cited

U.S. PATENT DOCUMENTS

| | | | |
|---|---|---|---|
| 4,854,328 A | * | 8/1989 | Pollack ...................... 600/549 |
| 4,924,210 A | | 5/1990 | Matsui et al. |
| 5,211,129 A | | 5/1993 | Taylor et al. |
| 5,214,409 A | | 5/1993 | Beigel |
| 5,235,326 A | | 8/1993 | Beigel et al. |
| 5,257,011 A | | 10/1993 | Beigel |
| 5,499,017 A | | 3/1996 | Beigel |
| 5,499,626 A | * | 3/1996 | Willham et al. ............ 600/300 |
| 6,049,801 A | * | 4/2000 | Whitmyer, Jr. ............... 707/10 |
| 6,342,839 B1 | * | 1/2002 | Curkendall et al. ...... 340/573.3 |
| 6,491,649 B1 | * | 12/2002 | Ombrellaro .................. 600/587 |
| 6,684,810 B2 | * | 2/2004 | Martin .................... 119/51.02 |
| 2002/0138302 A1 | * | 9/2002 | Bodnick ......................... 705/2 |
| 2002/0158765 A1 | * | 10/2002 | Pape et al. ............... 340/573.3 |
| 2003/0067386 A1 | * | 4/2003 | Skinner ...................... 340/540 |
| 2003/0163141 A1 | | 8/2003 | Malfanti et al. |
| 2003/0204417 A1 | * | 10/2003 | Mize ............................. 705/2 |
| 2004/0034575 A1 | | 2/2004 | Oh |
| 2006/0155174 A1 | * | 7/2006 | Glukhovsky et al. ....... 600/301 |

FOREIGN PATENT DOCUMENTS

EP   0 367 361 A2   5/1990

* cited by examiner

*Primary Examiner*—Ahshik Kim
(74) *Attorney, Agent, or Firm*—Larry L. Huston; Jeffrey V. Bamber; Leonard W. Lewis

(57) ABSTRACT

A business method for products and services. The business model provides for retail purchase of a product or service. The product or service is then transported from the retail point of purchase to a professional. The professional then activates the product or service for the consumer.

18 Claims, 1 Drawing Sheet

METHOD OF SELLING AND ACTIVATING CONSUMER PRODUCTS AND SERVICES

CROSS REFERENCE TO RELATED APPLICATIONS

This application claims the benefit of U.S. Provisional Application No. 60/557,523, filed Mar. 30, 2004.

FIELD OF THE INVENTION

The present invention relates to the sale and use of consumer products and services, and more particularly to products and services requiring professional input.

BACKGROUND OF THE INVENTION

Generally, consumer products and services fall into one of two categories. First, the product or service may be sold over-the-counter and used without professional assistance or input. Examples of such products and services include common household goods, food, OTC medications, and an endless list of other items purchased in everyday life. Alternatively, consumer products and services may be purchased with professional help. Examples include prescription medications, haircutting and other treatments, automobile repairs, and another endless list of products and services found in everyday life.

Rarely is there an opportunity for a business to effect a purchase over the counter, followed by professional installation or activation. Such products and services do, however, occur. For example, one may purchase a common household faucet or electrical switch at the retail hardware store and have the faucet or electrical switch later installed by a trained plumber or electrician. Likewise, the consumer may purchase a cell phone at a retail source. Upon purchase of the cell phone, it is remotely activated by the carrier. However, in each of these cases, certain trade-offs occur. For example, in the situation of the purchase from the hardware store, the user has the option of installing the faucet or electrical switch without professional assistance and risking improper installation. In the case of the telephone activation, the activation occurs remotely and the consumer may feel a loss of control, particularly if the activation is not successful on the first try. The situation becomes exacerbated if, as frequently occurs, the user is not aware that a problem has occurred in the telephone activation. For example, the user may judge problems in making/receiving calls on the phone to be attributable to unfamiliarity with the new phone, being located in an area of bad reception, or due to other problems.

Frequently, activation of devices occurs without professional direction. For example, radio frequency identification (RFID) chips are known to be utilized with and installed in animals. While there have been several attempts in the art to do so, none provides the multiple benefits of giving the consumer plural choices of RFID chips from which to choose, the convenience of purchasing at a retail outlet, and the assurance of professional activation by someone having the proper training. Illustrative of the attempts in the art limited to simply utilizing RFID chips in pets, without all of the aforementioned benefits, are found in U.S. Pat. No. 5,211,129, iss. May 18, 1993 to Taylor et al.; U.S. Pat. No. 5,214,409, iss. May 25, 1993 to Beigel; U.S. Pat. No. 5,235,326, iss. Aug. 10, 1993 to Beigel et al.; U.S. Pat. No. 5,257,011, iss. Oct. 26, 1993 to Beigel; U.S. Pat. No. 5,499,017, iss. Mar. 12, 1996 to Beigel; and U.S. 2003/0163141 A1, pub. Aug. 28, 2003, in the names of Malfanti et al.

Additionally, attempts to manage purchasing activation of devices relating to pets and other consumer products is known in the art, as each of these fails to provide the combination of retail convenience and professional competency needed by the consumer. Examples of such attempts in the art include U.S. Pat. No. 4,924,210, iss. May 8, 1990 to Matsui et al.; U.S. 2004/0034575 A1, pub. Feb. 19, 2004 in the name of Oh; and EP 0 367 361 A2, pub. May 9, 1990 in the name of Parker.

What is needed then is a way to continually provide the consumer with a product or service, or more preferably, a selection of products and services at the retail level. It is also needed that the consumer utilize professional installation and activation of such products as needed.

SUMMARY OF THE INVENTION

The present invention comprises a method of making a consumer product or consumer service usable. The method comprises the step of providing a consumer product or consumer service at a retail outlet. The product or services available for purchase by a consumer and ultimately purchased by a consumer. Instructions may be provided with the product or service. The instructions direct the consumer to take the product or service to a professional for activation. Following activation of the product or service by the professional, the product or service may then be used by the consumer.

In one embodiment, the product or service may not be usable as purchased, but only become usable upon activation by the professional. In an alternative embodiment, the product or service may be composed of two parts, each being necessary for the product or service to be usable by the consumer. One component of the product or service may be purchased at a retail outlet and the other may be provided by the professional. The professional may then combine the two components for subsequent activation.

DETAILED DESCRIPTION OF THE INVENTION

Figure 1:
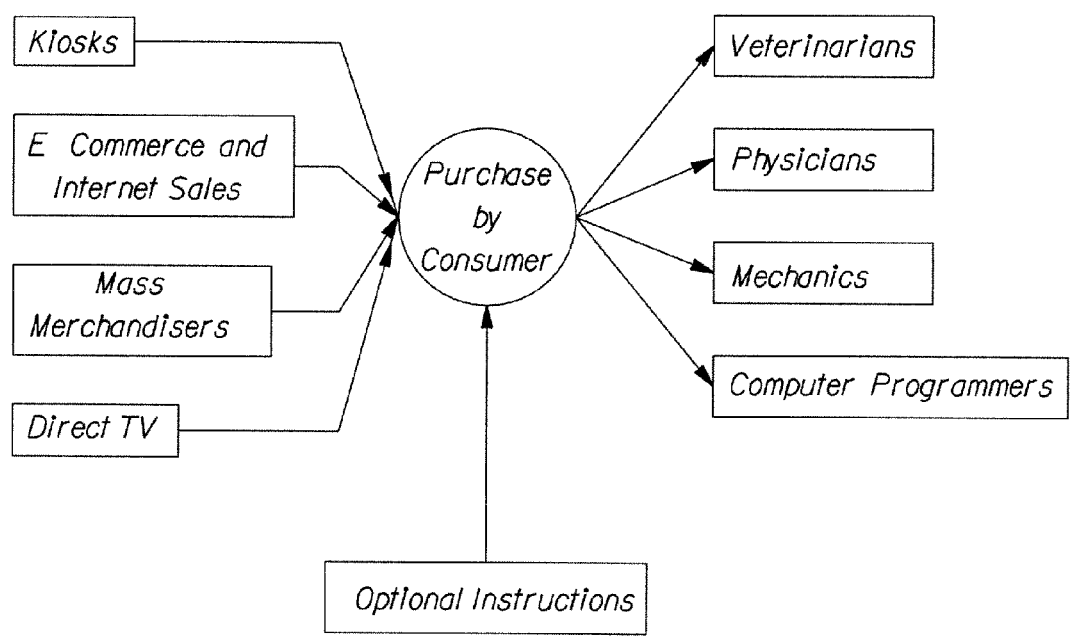
FIG. 1 is a schematic view of an exemplary process according to the present invention.

Referring to FIG. 1, consumer products and services occur are ubiquitous in everyday life. Such products are sold over-the-counter and include everything from individual aspirin to entire buildings. Such services may include discrete events, such as a haircut, or ongoing events, such as the supply of electricity to one's home. Sources of consumer products and services include retail outlets, such as mass merchandisers and family-owned businesses, direct TV marketing, kiosks, e-commerce and internet sales, etc. Each of these outlets, as well as any other point of purchase where the consumer is free to acquire the product upon present or deferred payment, including sale, rental or lease, is referred to hereunder as a "retail outlet."

The products and services contemplated hereunder are installed, activated or otherwise made usable by a professional. As used herein, any step or act which transforms the product or service from being unusable or extraordinarily difficult to use is referred to hereunder as "activation" of the product or service. Professionals, as the term is used hereunder, typically have earned a license, often by examination or licensure/registration. It is desired that the professional have training sufficient to enable proper and safe activation of the product or service and to do so in a manner which provides efficacy to the consumer using such product or service. Exemplary, non-limiting types of professionals contemplated hereunder include, but are not limited to, veterinarians, physicians including specialists such as dermatologists, etc., skilled trades, professional drivers, etc.

The consumer takes the product or service to be activated from the retail point of purchase to the professional. The professional then activates the product or service so that it can ultimately be utilized by the consumer. This arrangement provides several benefits. For example, many times products having significant benefits to consumers are available, but because of restrictions on use, application or availability, awareness of the product is low and the product may be underutilized. Conversely, by using a professional, the consumer is more confident that the product or service will be properly activated and be subsequently and properly used throughout its life. For example, if the consumer has questions about the activation, usage, or maintenance of the product or service, the professional can be consulted at that time.

Furthermore, by directing the consumer to specific professionals, a business relationship may be formed achieving a synergistic business benefit for both the consumer and the professional. An additional benefit may be that additional products and services might be bundled in an offer which would be even more beneficial to both the consumer and/or professional.

If desired, the fee for the professional's services may be wholly or partially incorporated into the retail price which the consumer pays for the product or service. For example, the consumer may receive a voucher redeemable for the professional's services. Alternatively, a rebate system may be utilized. Additionally, the price of the professional's services may be subsidized by the provider of the product or service at differing levels. For example, the entire cost of a professional affiliated with the provider of the product or service may be wholly subsidized, while other professionals are only partially subsidized.

In one embodiment the product or service may require the purchase of multiple complementary components in order to be functional. The multiple components may all be purchased by the consumer at a common retail outlet, or may be purchased at different retail outlets. In yet another embodiment, one component may be purchased at a retail outlet and a second component may be purchased from a professional. One component may be regulated or solely handled by the professional for safety reasons.

The professional from whom the second (or subsequent) component(s) is/are purchased is typically the same professional who activates the product or service. Alternatively, a first professional having expertise in selection may sell the second or subsequent component(s) and a second component having expertise in activation may perform the same.

The invention contemplated hereunder may be capable of multiple levels of or types of activation. For example the professional may activate all features of the product or service, or may activate only certain features in an effort to conserve power consumption by the product, etc.

It is necessary that the consumer transport or otherwise take the product or service from the retail point of purchase to the professional. Transport may be accomplished by the consumer, or by an agent designated to or by the consumer. Transport may occur physically as is typically the case or may also occur electronically through the Internet.

Preferably, the consumer product or service has instructions directing the consumer to the type of professional best able to activate that product or service. For example, an HVAC device might direct the consumer to have activation performed not only by a person trained in HVAC, but more specifically by a person trained in specific refrigerants used for HVAC. A product or service relating to computers might contain instructions which not only direct the consumer to a trained computer technician, but more particularly to a computer technician having specific training in network routers. Furthermore, many professionals have devices and tools not available to or usable by the public and which enable more efficacious activation of the product or service.

Of course, it is to be recognized that many professionals have certified training, as occurs in the case of physicians licensed as dermatologists, attorneys certified as specialists, insurance agents licensed to sell particular products, etc. The claimed invention provides the benefits to the professional of additional revenue due to higher market penetration of the product or service made available from the retail sector. This benefit is particularly advantageous if the professional becomes affiliated with a network associated with the sale and activation of that product or service. Furthermore, the professional's overhead is reduced by not having to carry inventory of the product now sold at a retail outlet.

The instructions may direct the consumer to take the product or service to a professional in a specific geographic location having a commercial affiliation with the product or service, Alternatively or additionally, the instructions may direct the consumer to take the product or service to the professional within a given period of time and/or remind the consumer of the necessity for follow-up visits. In any case, it is necessary that the product or service be transported from the point of purchase to the professional for activation. In an alternative embodiment, the professional may come to the point of purchase or to an alternative location selected by the consumer for activation. Transport of the product or service occurs thereby.

Upon receipt of the product or service by the professional, the professional activates the product or service for subsequent, and typically ongoing, use by the consumer or the consumer's designee. Activation may occur due to installation/physical manipulation of the product or service, as in the case of hardware, may occur due to electronic manipulation, implantation as in the case of pet RFID chips, as in the case of activation via radio signals or Internet communication, etc.

While the foregoing business model has been described in general terms, specific and nonlimiting examples are included below.

EXAMPLE 1

The business model described and claimed herein may be utilized to provide for RFID pet tracking. The consumer is provided with an RFID transponder, hereinafter referred to as a chip, at the point of sale. Any suitable chip which provides for tracking of a pet determined to be lost or for which medical information is needed may be utilized. Suitable RFID chips are made by Digital Angel and DataMars. The consumer purchases the RFID chip at a retail outlet such as a pet specialty store, mass merchandiser, over the Internet, from dog pounds, etc. By providing the RFID chip through common retail OTC markets, the consumer may conveniently purchase other pet items at the same time, as well as have a selection of chips to choose from.

Upon purchase, the consumer is preferably instructed by the RFID chip, or more likely its packaging, to take the chip and the pet to a veterinarian. Preferably, the veterinarian is one trained in the activation of such chips.

Upon reaching the veterinarian, the consumer presents the chip and the pet to the veterinarian. The veterinarian then implants or installs the chip into the pet. Typically, this is done by a hypodermic needle, typically a 17 gauge hypodermic needle. The veterinarian may be particularly trained in achieving proper placement of the RFID chip under the skin of the pet. Proper placement ensures that the pet may be later scanned to determine its owner, should the pet become lost. Additionally, if the consumer selects the appropriate chip, such chip may contain information relating to the health, medical history, and other information regarding the pet.

In an alternative embodiment the RFID chip may be purchased by the consumer at a retail outlet and a hypodermic needle designed to accommodate that particular RFID chip may be purchased from the veterinarian. This is one example of multiple components used to activate the consumer service being purchased from two different locations.

The pet may be scanned using any of the accepted scanning devices known in the market and available from Digital Angel and DataMars. The RFID chip activation in pets is endorsed by veterinarians, animal shelters, and the AKC. However, the market penetration stands only at approximately two percent. It is believed that by utilizing the business model described and claimed herein increased market penetration of RFID chip activation in pets may occur.

While the discussion in Example 1 has been directed to pets, the invention is not so limited. The invention may be used for livestock, migratory animals, and other species under study or consideration without being limited to domesticated pets.

EXAMPLE 2

Example 1 illustrates that the present invention may be utilized to find lost pets when they wander away. However, the invention is not so limited. The present invention may be used to find any lost or misplaced article. For example, the RFID chip of the present invention may be purchased at a retail outlet. The RFID chip may be implanted in any device which could become lost or stolen. The RFID chip may be encapsulated, or not encapsulated, as the ultimate use may require. The consumer could then take the RFID chip to an auto mechanic or dealership. More particularly, the RFID chip could then be implanted into an automobile. This would allow identification of the automobile through mass scanners, such as the EZ Pass system used by the PA Turnpike Commission. This method reduces the need for a continuous tracking system as occurs with the currently available GPS systems, such as ONSTAR offered by General Motors. The consumer has the benefit that a monthly subscription fee is unnecessary and need only worry about the chip in the rare event the car should become stolen.

EXAMPLE 3

The business model described and claimed herein may be utilized to provide over-the-counter beauty care treatments to human patients. The consumer purchases a beauty care product at a retail point of purchase. The product may instruct the consumer to take the product to a professional such as a licensed beautician or even a doctor. The professional then treats the consumer with the beauty care product purchased over-the-counter. This arrangement provides the benefit that the consumer may select his or her own specific beauty care treatment for the desired effect. For example, the consumer may desire to trade one efficacy for another, desire to treat or forego certain indications, etc. All of these decisions and trade-offs may be conducted without professional input. However, the professional may then best apply the beauty care product to the consumer upon activation.

The professional may also instruct the person in the usage of the product, devices to apply the product, or be used in conjunction with the product, and other matters that might affect the overall health and wellbeing of the patient. For example, the professional may instruct the patient as to certain types of diet, and other drugs which may be beneficially used in conjunction with the product.

EXAMPLE 4

A certificate for one or more particular medical services may be offered at a retail outlet. The consumer purchases the certificate, then takes it to his or her physician to redeem for the health care allocated by the certificate. For example, the certificate may provide for a strep culture by an affiliated physician or laboratory, an age-appropriate physical by a network physician, etc.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a consumer product or service usable, said method comprising the steps of:
   providing a consumer product or service at a retail outlet, wherein said retail outlet does not have a professional on site for activating said product or service, and the consumer product or service is selected from the group consisting of: RFID chips for implanting in animals or RFID chips for installing in articles of any type, a HVAC device, and beauty care products;
   making said product or service available for purchase by a consumer; and
   providing instructions with said product or service, said instructions directing the consumer to transport said product or service to a professional for activation of said product or service.

2. A method according to claim 1 wherein said instructions further comprise guidance as to which professional should be utilized for activation.

3. A method according to claim 1 wherein said step of providing a consumer product or service at a retail outlet comprises the step of providing a consumer product or service which is unusable by the consumer as purchased and only becomes usable upon activation by the professional.

4. A method according to claim 3 wherein said step of making a product or service available for purchase by a consumer comprises the step of making multiple components of said product or service available for purchase by the consumer, wherein the consumer separately purchases a plurality of components necessary in combination to activate said product or service.

5. A method according to claim 3 wherein said consumer purchases said multiple components of said product or service at two different locations, at least one said location being a retail outlet.

6. A method according to claim 1 wherein said consumer product or service is selected from the group consisting of: RFID chips for installing in articles other than animals, a HVAC device, and beauty care products.

7. A method according to claim 1 wherein said consumer product or service is selected from the group consisting of: a HVAC device, and beauty care products.

8. A method of making a consumer product or service available for use by a consumer, said method comprising the steps of:
   providing a consumer product or service at a retail outlet, wherein said retail outlet does not have a professional on site for activating said product or service, and the consumer product or service is selected from the group consisting of: RFID chips for implanting in animals or RFID chips for installing in articles of any type, a HVAC device, and beauty care products;
   making said product or service available for purchase from said retail outlet;
   providing a professional to professionally activate said product or service;
   bringing said product or service and said professional together at a common location; and
   professionally activating said product or service for subsequent use by the consumer.

9. A method according to claim 8 further comprising the step of providing instructions associated with said product or service, wherein said instructions provide guidance on said professional activation.

10. A method according to claim 9 wherein said consumer takes said product or service from said retail outlet where purchased to a remote location for said professional activation.

11. A method according to claim 8 wherein said product or service is sold at a retail price and further comprising the step of incorporating or subsidizing at least a portion of the fee for the professional activation in said retail price.

12. A method according to claim 8 wherein said consumer product or service is selected from the group consisting of: RFID chips for installing in articles other than animals, a HVAC device, and beauty care products.

13. A method according to claim 8 wherein said consumer product or service is selected from the group consisting of: a HVAC device, and beauty care products.

14. A method of providing a medical or beauty care product for consumer use, said method comprising the steps of providing a medical or beauty care product for treating a human being, said product being selected from the group consisting of: a certificate for one or more medical services, a certificate for a strep culture, a certificate for a physical examination, and a beauty care product, said product being made available for purchase by a consumer at a retail outlet, said product being incapable of use upon purchase by the consumer, taking said product from said retail outlet to a professional for activation by the professional; and professionally activating said product to render said product usable for its intended purpose.

15. A method according to claim 14 wherein said professional is a physician, dermatologist, other specialist physician, or a licensed beautician.

16. A method of providing a product usable for identification of a pet, said method comprising the steps of:
   providing a product for purchase by a consumer at a retail outlet, wherein said product usable for identification of a pet comprises an RFID chip, and said product is incapable of use upon purchase by the consumer;
   allowing said RFID chip to be purchased from said retail outlet;
   allowing said RFID chip purchased from said retail outlet and said pet to be taken to a veterinarian for activation of the RFID chip by the veterinarian;
   allowing said RFID chip to be implanted into said pet by said veterinarian; and
   allowing said RFID chip to be activated to render said product usable for its intended purpose to provide information about said pet.

17. A method according to claim 16 further comprising the step of scanning said pet to determine information regarding said pet from said RFID chip.

18. A method according to claim 16 comprising the step of providing a selection of a plurality of RFID chips at said retail outlet.

* * * * *